US011977341B2

(12) United States Patent
Yumoto et al.

(10) Patent No.: US 11,977,341 B2
(45) Date of Patent: May 7, 2024

(54) IMAGE FORMING APPARATUS

(71) Applicant: CANON KABUSHIKI KAISHA, Tokyo (JP)

(72) Inventors: Koji Yumoto, Ibaraki (JP); Riki Fukuhara, Chiba (JP); Shin Iwasaki, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 55 days.

(21) Appl. No.: 17/827,027

(22) Filed: May 27, 2022

(65) Prior Publication Data

US 2022/0382183 A1 Dec. 1, 2022

(30) Foreign Application Priority Data

May 28, 2021 (JP) ................................ 2021-089869

(51) Int. Cl.
*G03G 15/04* (2006.01)
*G03G 15/00* (2006.01)
*G03G 15/043* (2006.01)

(52) U.S. Cl.
CPC ..... *G03G 15/04072* (2013.01); *G03G 15/043* (2013.01); *G03G 15/5025* (2013.01); *G03G 15/5058* (2013.01); *G03G 15/5062* (2013.01)

(58) Field of Classification Search
CPC ........... G03G 15/04072; G03G 15/043; G03G 15/5025; G03G 15/5058; G03G 15/5062
See application file for complete search history.

(56) References Cited

U.S. PATENT DOCUMENTS

| | | | | |
|---|---|---|---|---|
| 9,213,294 | B2 | 12/2015 | Saito | |
| 2004/0239747 | A1* | 12/2004 | Maeda | G03G 15/0194 347/116 |
| 2015/0205222 | A1* | 7/2015 | Araki | G03G 15/50 399/53 |
| 2022/0244670 | A1 | 8/2022 | Tanaka et al. | |

FOREIGN PATENT DOCUMENTS

JP 2014-107648 A 6/2014

OTHER PUBLICATIONS

U.S. Appl. No. 17/825,119, filed Jun. 25, 2022.
U.S. Appl. No. 17/825,105, filed May 26, 2022.

* cited by examiner

*Primary Examiner* — Henok D Legesse
(74) *Attorney, Agent, or Firm* — Venable LLP

(57) ABSTRACT

An image forming apparatus includes an image forming unit configured to form an image on a sheet based on an image forming condition; an image reader configured to read an image for adjustment of the image forming condition, which is formed on the sheet; and a controller configured to control, in a case of a job for which printing of the image for adjustment is set, the image forming unit to form the image for adjustment on the sheet, and generate a correction value for the image forming condition based on a reading result of the image for adjustment, which has been obtained by the image reader, to thereby adjust the image forming condition based on the correction value.

9 Claims, 9 Drawing Sheets

IMAGE FORMING APPARATUS

BACKGROUND OF THE INVENTION

Field of the Invention

The present disclosure relates to an image forming apparatus, such as a printer, a copying machine, a facsimile machine, or a multifunction apparatus.

Description of the Related Art

An electrophotographic image forming apparatus forms (prints) an image on a sheet by the steps of forming an electrostatic latent image on a photosensitive member; developing the electrostatic latent image and transferring the developed electrostatic latent image onto the sheet; and fixing the transferred image to the sheet. The image formed on the sheet has an image density changed due to environmental conditions including temperature and humidity and deterioration of a developer used for the development. The image forming apparatus forms an image for adjustment for adjusting the image density, and adjusts image forming conditions and creates a tone correction table based on a result of reading this image for adjustment by a sensor, to thereby achieve stabilization of the image density. This is called "calibration." The calibration is feedback control, and there are cases in which the calibration is performed through use of a reading result of an image for adjustment formed on a sheet and in which the calibration is performed through use of a reading result of an image for adjustment on an image bearing member before being transferred onto the sheet.

In U.S. Pat. No. 9,213,294 B2, there is disclosed an image forming apparatus that measures an image for adjustment formed on a photosensitive member through use of a built-in sensor and performs calibration based on a measurement result of the image for adjustment. This image forming apparatus corrects, for example, the intensity of laser light for exposing the photosensitive member as an image forming condition. Herein, the intensity of laser light is referred to as "laser power" or "LPW." In Japanese Patent Application Laid-open No. 2014-107648, there is disclosed an image forming apparatus that performs calibration by forming an image for adjustment in a margin area of a sheet on which an image (user image) corresponding to an instruction from a user is formed. With the forming of the image for adjustment in the margin area, the calibration is performed in real time. The margin area in which the image for adjustment is formed is an area in an outer edge portion of the sheet which is to be cut off. This image forming apparatus can maintain an appropriate image forming condition while suppressing a decrease in productivity by avoiding interruption of an image forming operation.

In a case where the user sets the printing of the image for adjustment for a j ob, a correction value for the image forming conditions is generated based on the reading result of the image for adjustment printed on the sheet together with the user image. The correction value is accumulated as the job progresses and a large number of images for adjustment are read. In a case where a job for which the printing of the image for adjustment is not set is executed successively under this state, the correction value is canceled, and the image forming conditions are no longer adjusted. For that reason, there is a fear in that a color tint and other image quality of an image formed on a sheet in accordance with the job may greatly vary. In view of the above-mentioned problems, the present disclosure has an object to suppress variations in density of an image formed on a sheet even when setting of printing of an image for adjustment has been changed.

SUMMARY OF THE INVENTION

An image forming apparatus according to the present disclosure includes: an image forming unit configured to form an image on a sheet based on an image forming condition; an image reader configured to read an image for adjustment of the image forming condition, which is formed on the sheet; and a controller configured to: control, in a case of a job for which printing of the image for adjustment is set, the image forming unit to form the image for adjustment on the sheet, and generate a correction value for the image forming condition based on a reading result of the image for adjustment, which has been obtained by the image reader, to thereby adjust the image forming condition based on the correction value; and decrease, in a case where an image is formed based on the job for which the printing of the image for adjustment is set and then an image is formed based on a job for which the printing of the image for adjustment is not set, a change amount of the image forming condition based on the correction value generated while the image is being formed based on the job for which the printing of the image for adjustment is set, each time images corresponding to a predetermined number of pages have been formed.

Further features of the present invention will become apparent from the following description of exemplary embodiments (with reference to the attached drawings).

DESCRIPTION OF THE EMBODIMENTS

Now, an embodiment of the present disclosure is described in detail with reference to the accompanying drawings.

<Image Processing System>

Figure 1:
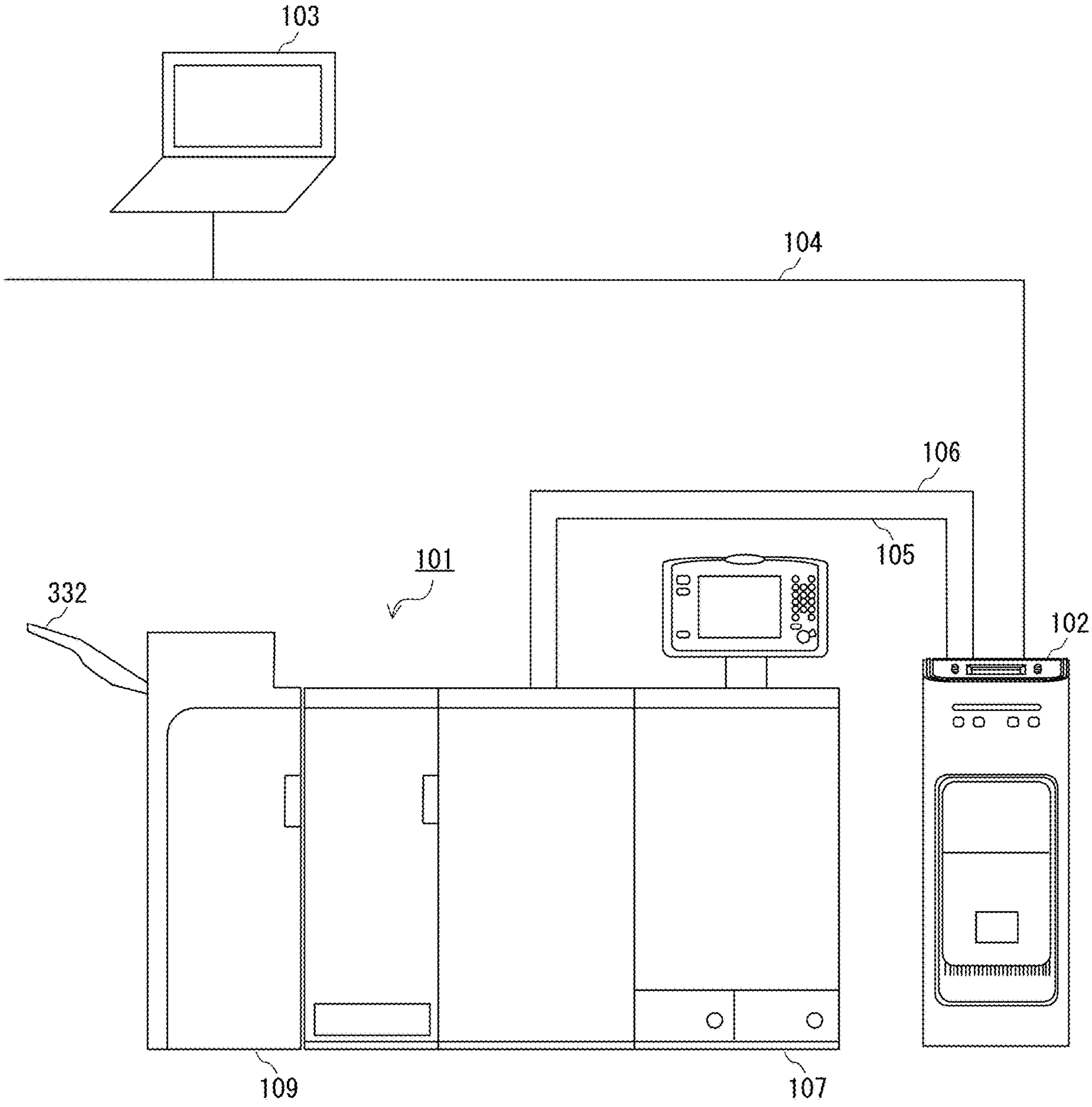
FIG. 1 is a configuration diagram of an image processing system.

FIG. 1 is a configuration diagram of an image processing system including an image forming apparatus according to this embodiment. The image processing system includes an image forming apparatus 101 and an external controller 102. Examples of the image forming apparatus 101 include a multifunction apparatus and a multifunction peripheral (MFP). Examples of the external controller 102 include an image processing controller, a digital front end (DFE), and a print server.

The image forming apparatus 101 and the external controller 102 are connected to each other so as to enable communication therebetween through an internal local area network (LAN) 105 and a video cable 106. The external controller 102 is connected to a client personal computer (PC) 103 through an external LAN 104. The external controller 102 obtains a print instruction (print job) from the client PC 103.

A printer driver having a function of converting an image into a print description language that can be processed by the external controller 102 is installed on the client PC 103. A user can instruct printing through the printer driver by various applications. The printer driver transmits image data to the external controller 102 based on a job instructed by the user. The external controller 102 receives the print job including the image data from the client PC 103, performs data analysis and rasterization processing thereon, and instructs the image forming apparatus 101 to print (to perform image formation) based on the image data.

The image forming apparatus 101 is configured by connecting a plurality of apparatus having different functions including a printing apparatus 107 to one another, and can perform complicated printing processing including bookbinding. The image forming apparatus 101 according to this embodiment includes the printing apparatus 107 and a finisher 109. The printing apparatus 107 forms an image on a sheet fed from a sheet feeder provided at a lower part of a main body, through use of a developer (for example, toner). The printing apparatus 107 forms yellow (Y), magenta (M), cyan (C), and black (K) images. A full-color image in which the images in the respective colors are superimposed on one another is formed on the sheet. The sheet having the image formed thereon is conveyed from the printing apparatus 107 to the finisher 109. The finisher 109 stacks such sheets having images formed thereon onto a stack tray 332. In addition, the finisher 109 in this embodiment has a function of cutting off a margin area in an outer edge portion of a sheet on which images for adjustment are formed as described later.

This image processing system is configured by connecting the external controller 102 to the image forming apparatus 101, but the external controller 102 is not always required. For example, the image forming apparatus 101 may be configured to obtain the print job including the image data directly from the client PC 103 through the external LAN 104. In this case, the image forming apparatus 101 is configured to perform the data analysis and rasterization processing that are supposed to be performed by the external controller 102. That is, the image forming apparatus 101 and the external controller 102 may be integrally configured.

<System Configuration>

Figure 2:
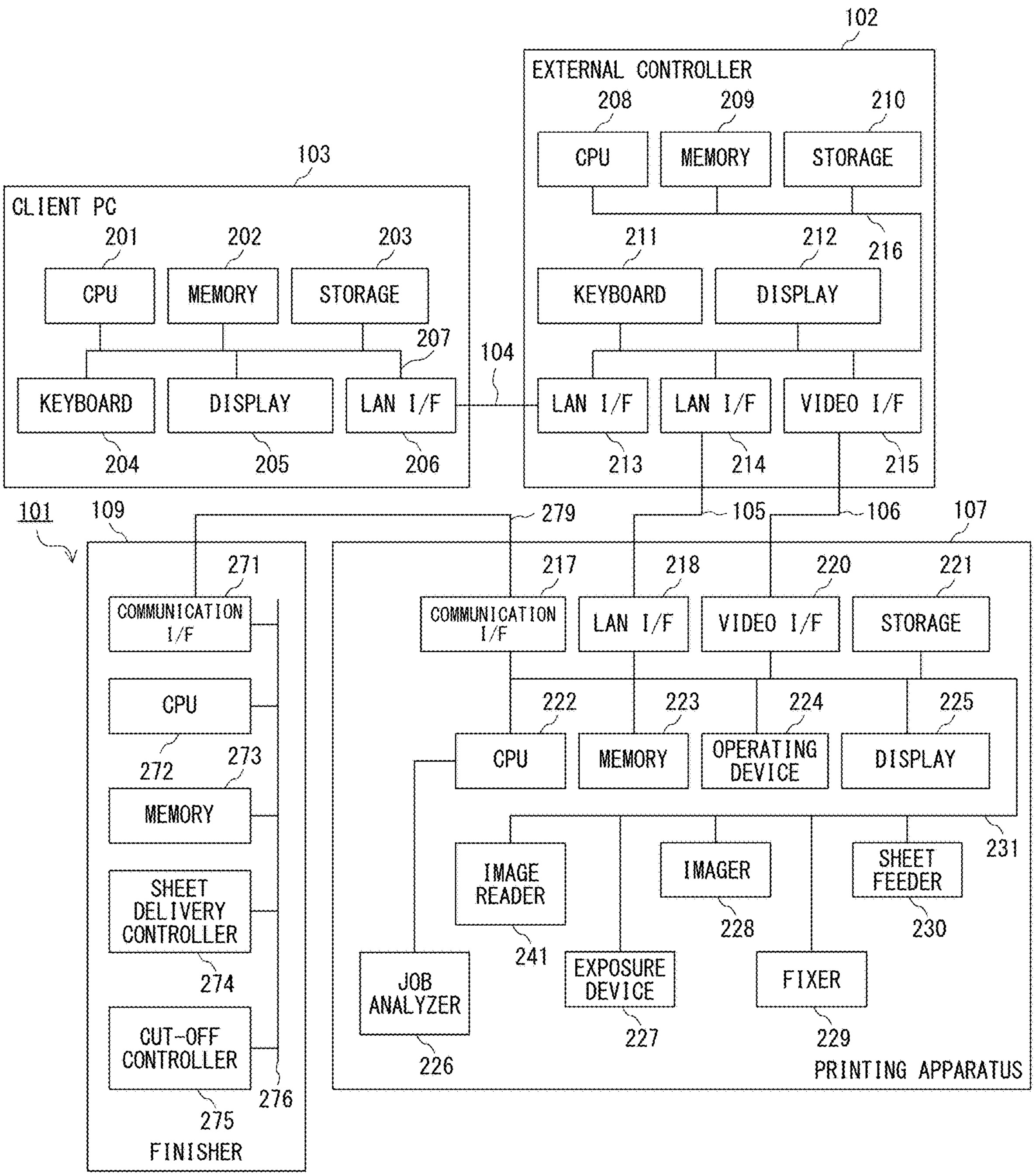
FIG. 2 is a system configuration diagram for illustrating how to control operations of the image processing system.

FIG. 2 is a system configuration diagram for illustrating how to control operations of the image processing system. In this case, a system configuration of each of the image forming apparatus 101, the external controller 102, and the client PC 103 is described.

Printing Apparatus

The printing apparatus 107 includes a communication interface (I/F) 217, a LAN I/F 218, and a video I/F 220 in order to communicate to/from other apparatus. The printing apparatus 107 includes a central processing unit (CPU) 222, a memory 223, a storage 221, an image reader 241, and a job analyzer 226 in order to control operations of the printing apparatus 107. The printing apparatus 107 includes an exposure device 227, an imager 228, a fixer 229, and a sheet feeder 230 in order to form an image. The printing apparatus 107 includes an operating device 224 and a display 225 as user interfaces. Those components are connected to one another through a system bus 231 so as to enable communication to/from one another.

The communication I/F 217 is connected to the finisher 109 through a communication cable 279, and controls communication to/from the finisher 109. In a case where the printing apparatus 107 and the finisher 109 operate in cooperation with each other, information and data are transmitted and received through intermediation of the communication I/F 217. The LAN I/F 218 is connected to the external controller 102 through the internal LAN 105, and controls communication to/from the external controller 102. The printing apparatus 107 receives a print setting and image data from the external controller 102 through intermediation of the LAN I/F 218. The video I/F 220 is connected to the external controller 102 through the video cable 106, and controls communication to/from the external controller 102. The printing apparatus 107 receives image data representing an image to be printed from the external controller 102 through intermediation of the video I/F 220.

The CPU 222 executes computer programs stored in the storage 221 to comprehensively control image processing and image forming processing (printing control). The memory 223 provides a work area for the CPU 222 to execute various kinds of processing. In a case of performing image forming processing, the CPU 222 controls the exposure device 227, the imager 228, the fixer 229, and the sheet feeder 230.

The exposure device 227 includes a photosensitive member, a charging wire which charges the photosensitive member, and a light source which exposes the photosensitive member to light in order to form an electrostatic latent image on the photosensitive member. The photosensitive member is, for example, a photosensitive belt having a photosensitive layer formed on a surface of a belt-like elastic member or a photosensitive drum having a photosensitive layer formed on a surface of a cylinder. In place of the charging wire, a charging roller may be used. The exposure device 227 charges a surface of the photosensitive member to a uniform negative potential through use of the charging wire. The exposure device 227 outputs laser light from the light source based on the image data. The laser light is scanned across the surface of the photosensitive member that has been uniformly charged. Thus, a potential of the photosensitive member changes at a position irradiated with the laser light, and an electrostatic latent image is formed on the surface of the photosensitive member. Four photosensitive members are provided in correspondence with the four colors of yellow (Y), magenta (M), cyan (C), and black (K). Electrostatic latent images corresponding to images in mutually different colors are formed on the four photosensitive members.

The imager 228 transfers a toner image formed on the photosensitive member onto the sheet. The imager 228 includes a developing device, a transfer unit, and a toner replenisher. The developing device forms a toner image by causing toner charged to a negative polarity to adhere from a developing cylinder to an electrostatic latent image formed on the surface of the photosensitive member. Four developing devices are provided in correspondence with the four colors of yellow (Y), magenta (M), cyan (C), and black (K). Each developing device visualizes the electrostatic latent image on the photosensitive member through use of the toner of the corresponding color. In a case where an amount of toner inside the developing device is insufficient due to the formation of the toner image, the developing device is replenished with toner by the toner replenisher.

The transfer unit includes an intermediate transfer belt, and transfers the toner image from each of the photosensitive members onto the intermediate transfer belt. A primary transfer roller is provided at a position opposed to each photosensitive member across the intermediate transfer belt. In a case where a positive potential is applied to each primary transfer roller, the toner images are transferred from the four photosensitive members onto the intermediate transfer belt while being superimposed on one another. Thus, a full-color toner image is formed on the intermediate transfer belt. The toner image formed on the intermediate transfer belt is transferred onto the sheet by a secondary transfer roller described later. The secondary transfer roller transfers the full-color toner image from the intermediate transfer belt onto the sheet in a case where a positive potential is applied to the secondary transfer roller.

The fixer 229 fixes the transferred toner image to the sheet. The fixer 229 includes a heater and a roller pair. The fixer 229 heats and pressurizes the toner image on the sheet by the heater and the roller pair to melt the toner image and fix the toner image to the sheet. Thus, the image is formed on the sheet. The sheet feeder 230 includes a conveyance roller and various sensors in a conveyance path, and controls a sheet feeding operation.

The image reader 241 reads the image formed on the conveyed sheet based on an instruction received from the CPU 222. For example, in a case of adjusting image forming conditions, the CPU 222 causes the image reader 241 to read images for adjustment of the image forming conditions, which are formed on the sheet. The job analyzer 226 analyzes setting information on the image forming apparatus 101 and print data received from the external controller 102. The operating device 224 is an input device which receives input of various settings and operation instructions from the user. Examples of the operating device 224 include various input keys and a touch panel. The display 225 is an output device which displays the setting information on the image forming apparatus 101 and a processing status (status information) of the print job.

Finisher

The finisher 109 is, for example, a large-capacity stacker. The finisher 109 includes a communication I/F 271, a CPU 272, a memory 273, a sheet delivery controller 274, and a cut-off controller 275. Those components are connected to one another through a system bus 276 so as to enable communication to/from one another. The communication I/F 271 is connected to the printing apparatus 107 through the communication cable 279, and controls communication to/from the printing apparatus 107. In a case where the finisher 109 and the printing apparatus 107 operate in cooperation with each other, information and data are transmitted and received through intermediation of the communication I/F 271. The CPU 272 executes control programs stored in the memory 273 to perform various kinds of control required for sheet delivery. The memory 273 stores the control programs. The memory 273 provides a work area for the CPU 272 to execute various kinds of processing. The sheet delivery controller 274 delivers the conveyed sheet onto the stack tray 332 based on an instruction received from the CPU 272. The cut-off controller 275 controls an operation of a cut-off mechanism which cuts off the margin area in the outer edge portion of the sheet based on the instruction received from the CPU 272.

External Controller

The external controller 102 includes a LAN I/F 213, a LAN I/F 214, and a video I/F 215 in order to communicate to/from other apparatus. The external controller 102 includes a CPU 208, a memory 209, and a storage 210 in order to control the operation of the external controller 102. The external controller 102 includes a keyboard 211 and a display 212 as user interfaces. Those components are connected to one another through a system bus 216 so as to enable communication to/from one another.

The LAN I/F 213 is connected to the client PC 103 through the external LAN 104, and controls communication to/from the client PC 103. The external controller 102 obtains the print job from the client PC 103 through intermediation of the LAN I/F 213. The LAN I/F 214 is connected to the printing apparatus 107 through the internal LAN 105, and controls communication to/from the printing apparatus 107. The external controller 102 transmits, for example, the print setting and the image data to the printing apparatus 107 through intermediation of the LAN I/F 214. The video I/F 215 is connected to the printing apparatus 107 through the video cable 106, and controls communication to/from the printing apparatus 107. The external controller 102 transmits the image data to the printing apparatus 107 through intermediation of the video I/F 215.

The CPU 208 executes computer programs stored in the storage 210 to comprehensively perform processing, such as reception of the image data transmitted from the client PC 103, RIP processing, and transmission of the image data to the image forming apparatus 101. The memory 209 provides a work area for the CPU 208 to execute various kinds of processing. The keyboard 211 is an input device which receives input of various settings and operation instructions from the user. The display 212 is an output device which displays information on an execution application of the external controller 102 as a still image or a moving image.

Client PC

The client PC 103 includes a CPU 201, a memory 202, a storage 203, a keyboard 204, a display 205, and a LAN I/F 206. Those components are connected to one another through a system bus 207 so as to enable communication to/from one another.

The CPU 201 executes computer programs stored in the storage 203 to control the operation of the client PC 103. In this embodiment, the CPU 201 creates image data and transmits a print job. The memory 202 provides a work area for the CPU 201 to execute various kinds of processing. The keyboard 204 and the display 205 are user interfaces. The keyboard 204 is an input device which receives instructions from the user. The display 205 is an output device which displays information on an execution application of the client PC 103 as a still image or a moving image. The LAN I/F 206 is connected to the external controller 102 through the external LAN 104, and controls communication to/from the external controller 102. The client PC 103 transmits the print job to the external controller 102 through the LAN I/F 206.

The external controller 102 and the image forming apparatus 101 are connected through the internal LAN 105 and the video cable 106, but may be connected, for example, only through a video cable as long as data required for printing can be transmitted and received therebetween. It suffices that each of the memory 202, the memory 209, the memory 223, and the memory 273 is a storage device for holding data and programs. As those memories, it is possible to use, for example, a volatile random access memory (RAM), a non-volatile read only memory (ROM), a storage, and a universal serial bus (USB) memory.

<Configuration of Image Forming Apparatus>

Figure 3:
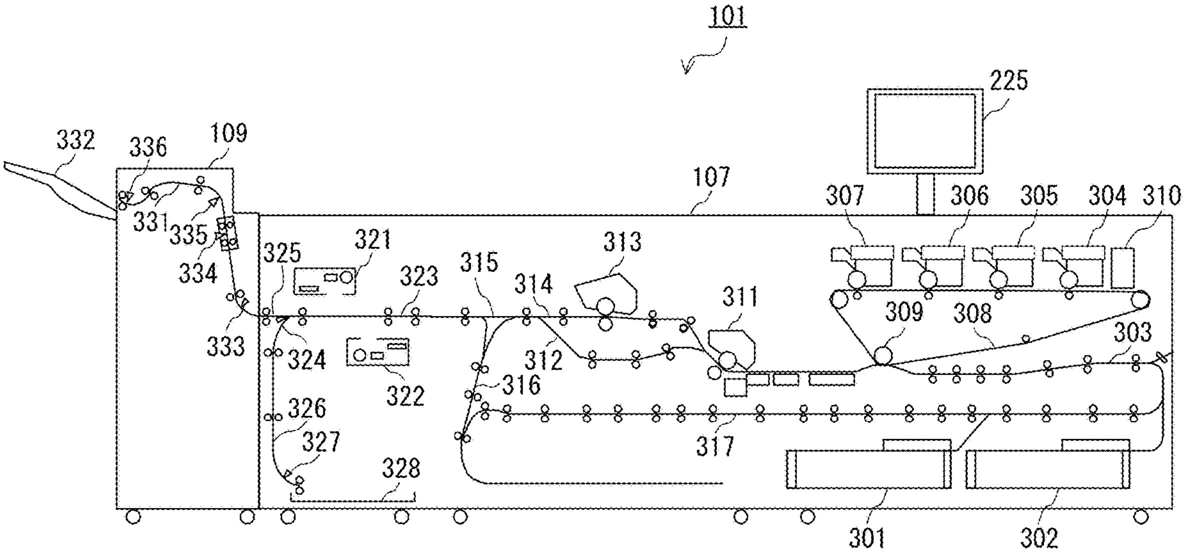
FIG. 3 is a configuration diagram of an image forming apparatus.

FIG. 3 is a configuration diagram of the image forming apparatus 101. The display 225 is provided at an upper part of a casing of the printing apparatus 107. The display 225 displays information for a printing status and settings of the image forming apparatus 101. The sheet having the user image corresponding to the job formed thereon by the printing apparatus 107 is conveyed to the finisher 109 provided in the subsequent stage.

The printing apparatus 107 includes, as the sheet feeder 230, a plurality of sheet feeding decks 301 and 302, conveyance paths 303, 312, 314, 315, and 323, a reverse path 316, a double-sided conveyance path 317, a downstream conveyance path 325, a delivery path 326, and various rollers. Mutually different types of sheets can be stored in the sheet feeding decks 301 and 302. Of the sheets stored in the sheet feeding decks 301 and 302, an uppermost sheet is separated and fed to the conveyance path 303. The printing apparatus 107 includes, as the exposure device 227, image forming units 304, 305, 306, and 307 for forming an image. The printing apparatus 107 forms a color image. To that end, the image forming unit 304 forms a black (K) image (toner image). The image forming unit 305 forms a cyan (C) image (toner image). The image forming unit 306 forms a magenta (M) image (toner image). The image forming unit 307 forms a yellow (Y) image (toner image).

The printing apparatus 107 includes, as the imager 228, a secondary transfer roller 309 and an intermediate transfer belt 308 onto which the toner images are to be transferred from the image forming units 304, 305, 306, and 307. The intermediate transfer belt 308 is rotated clockwise in FIG. 3, and the toner images are superimposed on one another and transferred in the order of the image forming unit 307, the image forming unit 306, the image forming unit 305, and the image forming unit 304 (primary transfer). Thus, a full-color toner image is formed on the intermediate transfer belt 308. The intermediate transfer belt 308 is rotated, to thereby carry the toner image to the secondary transfer roller 309. The sheet is conveyed to the conveyance path 303 at a timing at which the toner image is carried to the secondary transfer roller 309. The secondary transfer roller 309 transfers the toner image on the intermediate transfer belt 308 onto the conveyed sheet (secondary transfer).

In the vicinity of the intermediate transfer belt 308, an optical sensor 310 is provided. The optical sensor 310 is located downstream of the image forming units 304, 305, 306, and 307 in the rotation direction of the intermediate transfer belt 308. The optical sensor 310 reads an image (toner image) transferred from the image forming units 304, 305, 306, and 307 onto the intermediate transfer belt 308. The optical sensor 310 includes a light emitter and a light receiver for receiving light reflected by an object to be measured. The optical sensor 310 outputs an output voltage based on a light reception result of the light reflected by the image for adjustment for adjusting the image forming conditions, which has been formed on the intermediate transfer belt 308. The CPU 222 performs calibration for generating image forming conditions based on the output voltage output from the optical sensor 310.

The printing apparatus 107 includes, as the fixer 229, a first fixing device 311 and a second fixing device 313. The first fixing device 311 and the second fixing device 313, each having the same configuration, fix the toner image to the sheet. To that end, the first fixing device 311 and the second fixing device 313 each include a pressure roller and a heating roller. The sheet is heated and pressurized by passing between the pressure roller and the heating roller to have the toner image melted and press-fixed. The sheet that has passed through the second fixing device 313 is conveyed to the conveyance path 314. The second fixing device 313 is arranged downstream of the first fixing device 311 in a sheet conveying direction, and is used for adding a gloss to the image on the sheet, which has been subjected to fixing processing by the first fixing device 311, and for ensuring fixability. For that reason, the second fixing device 313 may not be used depending on the type of sheet and the content of the print job. The conveyance path 312 is provided in order to convey the sheet subjected to the fixing processing by the first fixing device 311 without passing the sheet through the second fixing device 313.

At a position after the conveyance path 314 and the conveyance path 312 merge, the conveyance path 315 and the reverse path 316 are provided. In a case where duplex printing is instructed, the sheet is conveyed to the reverse path 316. The sheet conveyed to the reverse path 316 is reversed in the reverse path 316 in terms of the conveying direction, and conveyed to the double-sided conveyance path 317. A surface (first surface) of the sheet on which an image has been formed is reversed by the reverse path 316 and the double-sided conveyance path 317. The sheet is conveyed to the conveyance path 303 by the double-sided conveyance path 317, and passes through the secondary transfer roller 309 and the fixer 229, to thereby have an image formed on a second surface of the sheet.

In a case of single-sided printing or in a case where images are formed on both sides by duplex printing, the sheet is conveyed to the conveyance path 315. A conveyance path 323 is arranged downstream of the conveyance path 315 in the sheet conveying direction.

Figure 4:
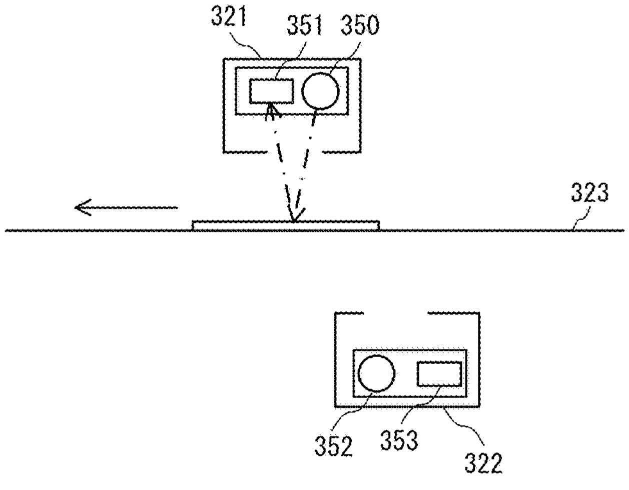
FIG. 4 is an explanatory view of CISs.

As the image reader 241, contact image sensors (CISs) 321 and 322 are arranged in the conveyance path 323 so as to be opposed to each other across the conveyance path 323. FIG. 4 is an explanatory view of the CISs 321 and 322. The CIS 321 is an optical sensor which reads an image on an upper surface of the sheet being conveyed along the conveyance path 323. The CIS 322 is an optical sensor which reads an image on a lower surface of the sheet being conveyed along the conveyance path 323.

The CIS 321 includes a light emitting diode (LED) 350 serving as a light source and a reading sensor 351 serving as a light receiver. The LED 350 irradiates the upper surface of the sheet with light at a timing at which the sheet conveyed along the conveyance path 323 reaches a reading position. The reading sensor 351 includes a plurality of light-receiving elements (photoelectric conversion elements) in a direction perpendicular to the sheet conveying direction. Therefore, the direction perpendicular to the sheet conveying direction is a main scanning direction of the CIS 321. The reading sensor 351 receives the light reflected by the sheet through the light-receiving elements. The plurality of light-receiving elements of the reading sensor 351 each output an output value (electric signal) based on the intensity of the reflected light that has been received. Each output value (electric signal) output from the plurality of light-receiving elements is transmitted to the CPU 222. In this manner, an image formed on the sheet is read.

The CIS 322 includes an LED 352 and a reading sensor 353 having the same configurations as those of the CIS 321. The CIS 322 operates in the same manner as the CIS 321 to read an image formed on the lower surface of the sheet at a timing at which the sheet conveyed along the conveyance path 323 reaches a reading position. In addition to the CISs 321 and 322, the image reader 241 can also be implemented by a CCD or CMOS sensor.

The printing apparatus 107 in this embodiment can form images for adjustment for adjusting the image forming conditions on both sides of the sheet. A sheet having the images for adjustment formed thereon is referred to as "chart for adjustment." The printing apparatus 107 prints, together with the user image, the images for adjustment on a sheet to create a chart for adjustment, and causes the CIS 321 and the CIS 322 to read the images for adjustment. Results of reading the chart for adjustment by the CIS 321 and the CIS 322 are stored in the memory 223. The CPU 222 refers to the memory 223 to analyze the results of reading the chart for adjustment by the CIS 321 and the CIS 322, and feeds back the analyzed results to the image forming conditions to perform calibration.

The image for adjustment to be formed on the chart for adjustment may be not only an image for detecting an image density but also an image for detecting geometric characteristics of an image or an image for detecting color misregistration. The geometric characteristics of the image refer to, for example, squareness and a printing position of the image on the sheet. In a case where the image for adjustment for detecting the geometric characteristics of the image is formed, the CPU 222 adjusts the image forming conditions in order to suppress variations in the geometric characteristics based on the reading results obtained by the CIS 321 (or CIS 322). The CPU 222 controls, for example, a light emission timing of the light source of the exposure device 227 based on the image forming conditions, to thereby adjust the geometric characteristics of the image to ideal geometric characteristics.

Further, in a case where an image for adjustment for detecting the color misregistration is formed, the CPU 222 detects the color misregistration based on the reading results obtained by the CIS 321 (or the CIS 322). The CPU 222 adjusts the image forming conditions based on the detected color misregistration in order to suppress the color misregistration. The CPU 222 controls, based on the image forming conditions, a position of an image to be formed on each photosensitive member by the exposure device 227, to thereby correct the color misregistration.

The user image is not printed on the chart for adjustment in some cases. A sheet on which not the user image but only the image for adjustment is printed is excluded so as not to be mixed in the sheets on which the user images are printed. To that end, the printing apparatus 107 includes a flapper 324, the delivery path 326, a conveyance sensor 327, and a delivery tray 328. The sheet on which only the image for adjustment is printed and which has the image for adjustment read by the CISs 321 and 322 is conveyed to the delivery path 326 by the flapper 324. The sheet conveyed to the delivery path 326 is delivered to the delivery tray 328.

The sheet on which the user image is printed is conveyed from the conveyance path 323 to the downstream conveyance path 325 by the flapper 324. A sheet conveyed to the downstream conveyance path 325 is passed over to the finisher 109. In a case where the printing apparatus 107 obtains a notification of occurrence of a conveyance jam from the finisher 109, irrespective of whether or not the user image is printed, the printing apparatus 107 switches the flapper 324 toward the delivery path 326 to deliver all the sheets in the machine (residual sheets) to the delivery tray 328. The delivery of the residual sheets to the delivery tray 328 reduces a load on the user in jam clearance.

The finisher 109 can stack the sheets passed over from the printing apparatus 107. The finisher 109 includes a conveyance path 331 and the stack tray 332 for stacking the sheets. In addition, the finisher 109 includes a cut-off mechanism (not shown), and cuts off the margin area in which the image for adjustment is printed from the sheets passed over from the printing apparatus 107. With the margin area having been cut off, the sheet becomes a printed matter on which only the user image is printed. Such printed matters are stacked onto the stack tray 332. In a case where the image for adjustment is not printed, the sheet is not subjected to the cut-off, and is stacked onto the stack tray 332.

The conveyance path 331 is provided with conveyance sensors 333, 334, 335, and 336. The sheets conveyed from the printing apparatus 107 are stacked on the stack tray 332 through the conveyance path 331. The conveyance sensors 333, 334, 335, and 336 each detect passage of the sheet being conveyed along the conveyance path 331. In a case where a leading edge or a trailing edge of the sheet in the conveying direction is not detected by the conveyance sensors 333, 334, 335, and 336 even after a lapse of a predetermined time period since start of the conveyance of the sheet, the CPU 272 determines that a conveyance jam (conveyance abnormality) has occurred in the finisher 109. In this case, the CPU 272 notifies the printing apparatus 107 that a conveyance jam has occurred.

<Images for Adjustment>

Figure 5A:
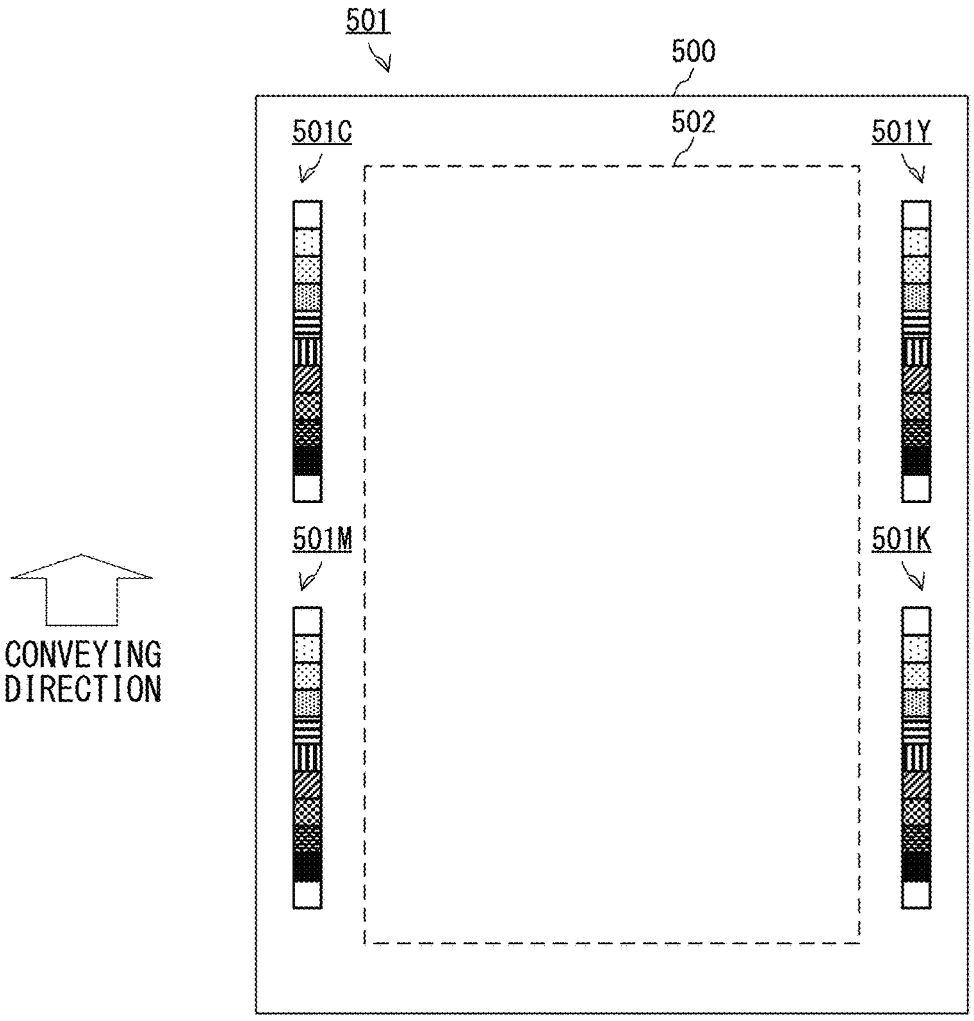
FIG. 5A and FIG. 5B are exemplary views of images for adjustment.
Figure 5B:
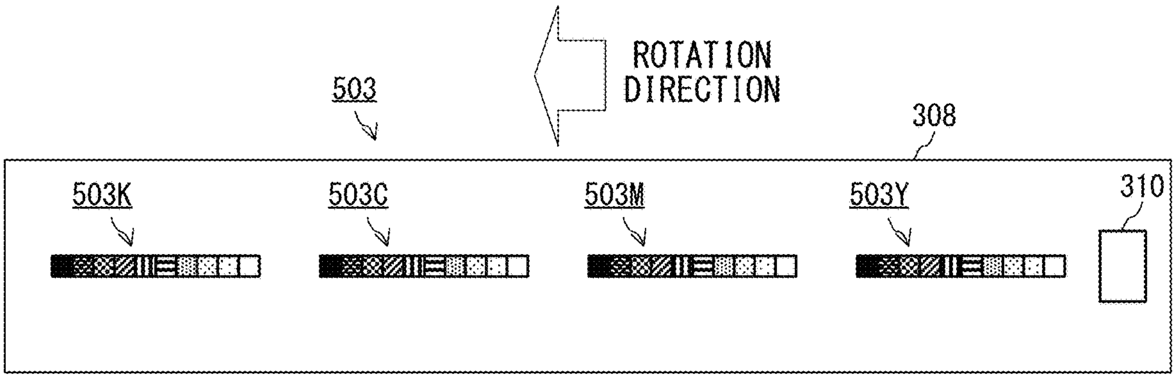

FIG. 5A and FIG. 5B are exemplary views of the images for adjustment for detecting the image density. In FIG. 5A, a chart 500 for adjustment in which images 501 for adjustment are formed on the sheet is illustrated as an example. In FIG. 5B, images 503 for adjustment borne on the intermediate transfer belt 308 are illustrated as an example.

FIG. 5A is an exemplary view of the chart for adjustment. The chart 500 for adjustment is conveyed in a longitudinal direction of the chart 500 for adjustment. The images 501 for adjustment are images for adjustment for image density correction, and are formed on one surface of the sheet for respective colors. The sheet is provided with an area 502 in which the user image is to be printed, and the images 501 for adjustment are formed in a margin area around the area 502.

In this embodiment, the images 501 for adjustment are formed in the margin area at both end portions of the sheet in a direction (short-side direction of the sheet) perpendicular to the sheet conveying direction. That is, the images 501 for adjustment of two colors are formed in one end portion of the sheet in the short-side direction, and the images 501 for adjustment of the remaining two colors are formed in the other end portion of the sheet in the short-side direction. In this embodiment, images 501C and 501M for adjustment of cyan and magenta are formed in one end portion of the sheet in the short-side direction, and images 501Y and 501K for adjustment of yellow and black are formed in the other end portion of the sheet in the short-side direction. Thus, the images 501 for adjustment are not formed in a leading edge portion of the sheet in the conveying direction, and it is possible to more reliably suppress occurrence of winding of the sheet during the fixing processing.

The images 501 for adjustment are each formed of a plurality of tone patches (11 tones) in which a tone value of each color is varied stepwise. The plurality of tone patches are each, for example, a square shape having a side of about 8 mm, and are arranged in a row in the conveying direction. In the tone patches of each color, a tone patch for detecting a texture of the sheet (that is, a tone patch having a tone value of 0) is located at each of both ends of a row of the other tone patches. Nine tone patches having evenly distributed tone values are arranged so as to be sandwiched between the tone patches having a tone value of 0. In a case where the tone value is represented by a range of from 0 to 255, the images 501 for adjustment are each formed of the tone patches of each color having tone values of 0, 16, 32, 64, 86, 104, 128, 176, 224, 255, and 0. The images 501 for adjustment are not limited to yellow, magenta, cyan, and black, and may be formed of respective colors of red, green, and blue and process black. The size and the tone order are not limited as well.

The images 503 for adjustment on the intermediate transfer belt 308 of FIG. 5B are each formed at such a position as to pass through a reading position of the optical sensor 310 by the rotation of the intermediate transfer belt 308. The intermediate transfer belt 308 bears the images 503 for adjustment as the image bearing member, and is rotated so that the images 503 for adjustment each pass through the reading position of the optical sensor 310. Images 503Y, 503M, 503C, and 503K for adjustment of the respective colors are linearly arranged in the rotation direction of the intermediate transfer belt 308. The images 503Y, 503M, 503C, and 503K for adjustment are each formed of a plurality of tone patches (10 tones) in which each tone value is varied stepwise. The plurality of tone patches are each, for example, a square shape having a side of about 10 mm, and are arranged in a row in the rotation direction of the intermediate transfer belt 308.

In the tone patches of each color, a tone patch for detecting a texture of the intermediate transfer belt 308 (that is, a tone patch having a tone value of 0) is located in one end portion of a row of the tone patches. Nine tone patches having evenly distributed tone values are arranged so as to follow the tone patch having a tone value of 0. In a case where the tone value is represented by a range of from 0 to 255, the images 503 for adjustment are each formed of the tone patches of each color having tone values of 0, 16, 32, 64, 86, 104, 128, 176, 224, and 255. The images 503 for adjustment are not limited to yellow, magenta, cyan, and black, and may be formed of respective colors of red, green, and blue and process black. The size and the tone order are not limited as well. In a case where a plurality of optical sensors 310 are provided along a direction perpendicular to the rotation direction of the intermediate transfer belt 308, a plurality of images 503 for adjustment may also be arranged at the reading positions of the respective optical sensors 310.

<Method of Setting Automatic Adjustment>

Figure 6A:
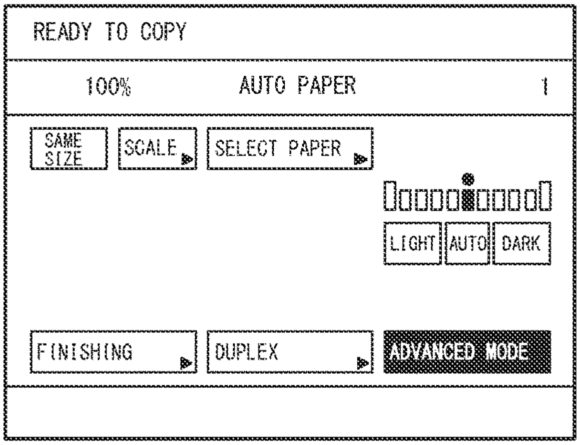
FIG. 6A and FIG. 6B are exemplary views of a setting screen.
Figure 6B:
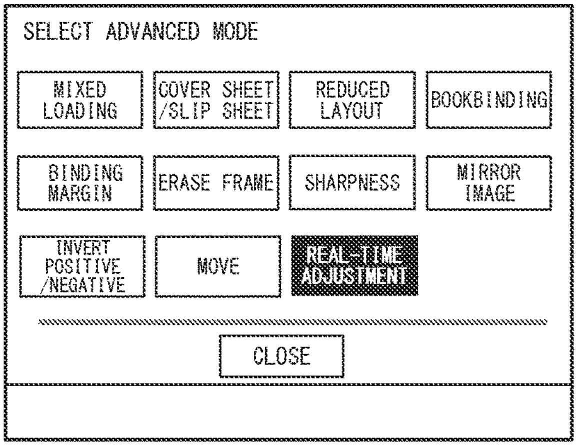

The image forming apparatus 101 according to this embodiment is capable of setting automatic adjustment for automatically adjusting the image forming conditions during printing in real time. FIG. 6A and FIG. 6B are explanatory views of a setting screen for setting the automatic adjustment. The setting screen is displayed on the display 225 by the CPU 222. The user can set the automatic adjustment from the setting screen through the operating device 224. The user sets the automatic adjustment before instructing execution of printing.

FIG. 6A is an illustration of an initial screen. In a case where the user selects a soft key labeled "ADVANCED MODE" from the initial screen, the CPU 222 displays an advanced mode selection screen of FIG. 6B on the display 225. In a case where the user selects a soft key labeled "CLOSE" from the advanced mode selection screen, the CPU 222 displays the initial screen of FIG. 6A on the display 225. In a case where the user selects a soft key labeled "REAL-TIME ADJUSTMENT" from the advanced mode selection screen, setting for printing the images for adjustment in the margin area of the sheet on which a user image corresponding to a job has been printed is completed. In the real-time adjustment, the images 501 for adjustment are formed in the margin area of the sheet on which the user image has been printed, and hence the image forming conditions are adjusted every time an image is formed in accordance with a job. The CPU 222 notifies the external controller 102 that the real-time adjustment has been set. In a case where a job is started, the external controller 102 instructs the CPU 222 to print the images 501 for adjustment based on the real-time adjustment.

<Image Density Correction>

Figure 7:
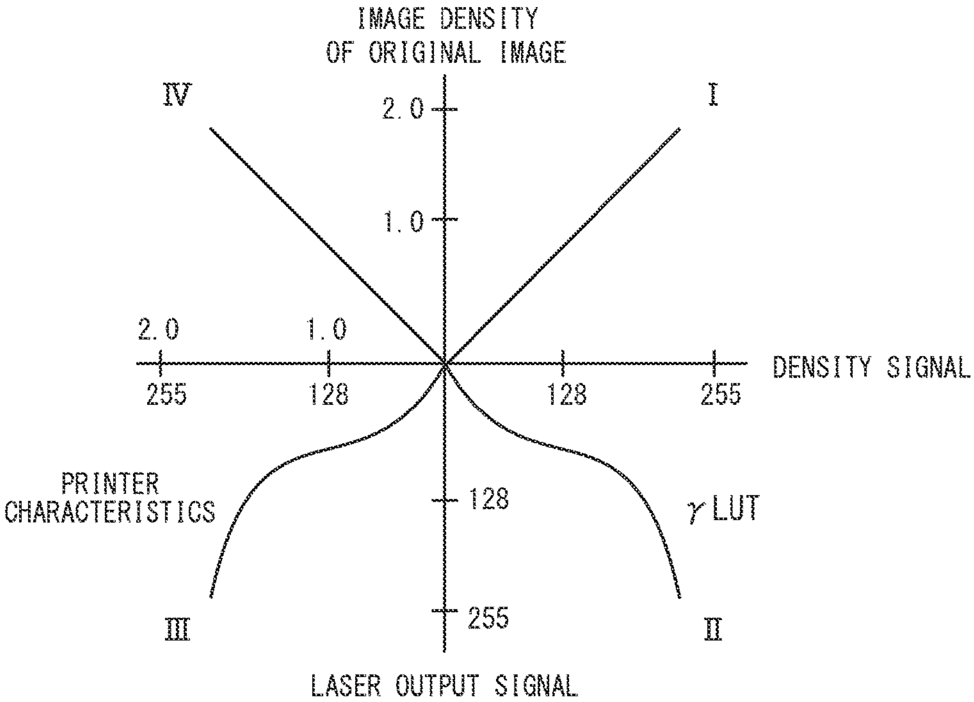
FIG. 7 is a four-quadrant chart for showing how a tone is reproduced.

FIG. 7 is a four-quadrant chart for showing how the tones are reproduced. Quadrant I represents reading characteristics of the sensor which has read an original image. The sensor represents a relationship between the density of an image (original image) to be printed and an input value of image data (density signal) indicating the image. Quadrant II represents a conversion condition (γLUT) for converting the density signal into a laser output signal indicating an amount of laser light output from the exposure device 227. Quadrant III represents tone characteristics (printer characteristics) of the printing apparatus 107 indicating a relationship between the laser output signal and the density (image density) of the image formed on the sheet. Quadrant IV indicates a relationship between the density of the original image and the density (image density) of the image formed on the sheet. That is, the four-quadrant chart represents total tone reproduction characteristics of the printing apparatus 107 illustrated in FIG. 1.

The printing apparatus 107 generates a conversion condition (γLUT) in quadrant II so that the density of the original image and the image density have an ideal relationship (linear relationship). Thus, in a case where a γLUT is generated based on the reading results obtained by the reading sensors 351 and 353, the CPU 222 obtains tone characteristics from the reading results of the images 501 for adjustment, and generates a γLUT so that the tone characteristics become ideal tone characteristics. Meanwhile, in a case where a γLUT is generated based on the reading result obtained by the optical sensor 310, the CPU 222 obtains tone characteristics from the reading results of the images 503 for adjustment, and generates a γLUT so that the tone characteristics become ideal tone characteristics. An image signal having the tone characteristics converted by the γLUT is converted into a pulse signal corresponding to a dot width by a pulse width modulation (PWM) circuit of a laser driver, and is transmitted to the laser driver for driving and controlling the exposure device 227. In this embodiment, a tone reproduction method based on pulse width modulation is used for all the colors of yellow, magenta, cyan, and black.

The laser light output from the exposure device 227 is scanned, to thereby form, on the photosensitive drum, an electrostatic latent image having the tones controlled by changing the dotted area to have predetermined tone characteristics. This electrostatic latent image is developed into a toner image, and the toner image is transferred onto a sheet and fixed to the sheet, to thereby reproduce a tone image.

In regard to a halftone tone patch, which is not a tone patch having the highest image density among the images 501 for adjustment of the respective colors (this state is hereinafter referred to as "solid"), correction is performed through use of a feedback rate for the γLUT. For example, in a case where the measured image density of the solid image is higher than a target density (DensTgt), the γLUT is corrected so that the image density is lowered. That is, in a case where the image density of an image formed through use of the intensity (LPW) of predetermined laser light is higher than a predetermined image density, an exposure time of the laser light is shortened. However, in a case where the exposure time is shortened, jaggies may occur in characters and thin lines, and the image quality may deteriorate. In such a case, a set value of LPW is changed, to thereby avoid excessive shortening of the exposure time.

<Correction of LPW in Case of Job in which Images for Adjustment are printed on Sheet>

Figure 8:
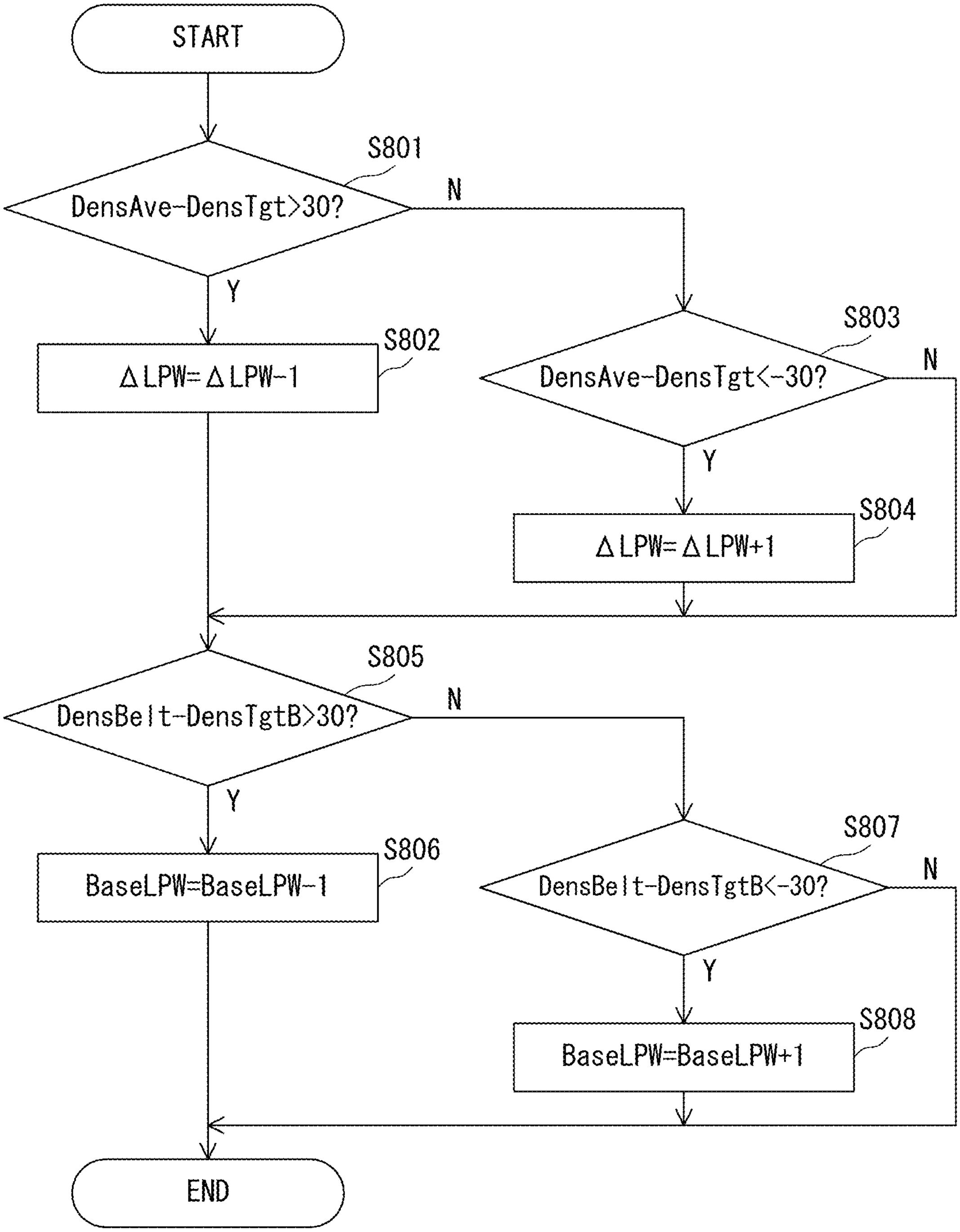
FIG. 8 is a flow chart for illustrating processing for determining LPW.

The set value of LPW is corrected as follows. First, the solid tone patch (solid image), which has the highest image density in the images 501 for adjustment of FIG. 5A, is read for a predetermined number of sheets (in this case, "5" sheets). A result of averaging the image densities obtained in this manner is set as an average density (DensAve). In addition, the image density of a tone patch having a tone value of 255, which has the highest image density in the images 503 for adjustment of FIG. 5B, is set as DensBelt. The image density (DensBelt) of the tone patch having a tone value of 255 is obtained based on the detection results of the images 503 for adjustment, which have been obtained by the optical sensor 310, each time the user images corresponding to "28" pages have been formed. The set value of LPW is corrected based on a correction value of LPW (ΔLPW), which is a comparison result of comparing the average density (DensAve) to the target density, and a basic laser power (BaseLPW), which is a comparison result of comparing the image density (DensBelt) to the target density. The initial value of ΔLPW is "0." FIG. 8 is a flow chart for illustrating processing for determining LPW.

The CPU 222 compares the average density to the target density (DensTgt) (Step S801). As a result of the comparison, in a case where the average density is higher than the target density (DensTgt) by a value larger than a predetermined value (in this case, "30") ("Y" in Step S801), the CPU 222 subtracts "1" from ΔLPW (Step S802). In a case where a difference between the average density and the target density (DensTgt) is smaller than the predetermined value (in this case, smaller than 30) ("N" in Step S801), the CPU 222 determines whether or not the average density is lower than the target density by a value larger than a predetermined value (in this case, "30") (Step S803). In a case where the average density is lower than the target density (DensTgt) by a value larger than the predetermined value (in this case, "30") ("Y" in Step S803), the CPU 222 adds "1" to ΔLPW (Step S804). In a case where the average density is not lower than the target density (DensTgt) by a value larger than the predetermined value (in this case, "30") ("N" in Step S803), the CPU 222 does not change ΔLPW.

After ΔLPW is determined, the CPU 222 determines the basic laser power (BaseLPW) based on the detection results of the images 503 for adjustment formed each time the user images corresponding to "28" pages have been formed. The CPU 222 detects the image densities of the images 503 for adjustment based on the detection results of the images 503 for adjustment, which have been obtained by the optical sensor 310, and compares the detected density (DensBelt) of the images 503 for adjustment having a tone value of 255 to a target density (DensTgtB) (Step S805). In this case, the target density (DensTgtB) is the same as the target density (DensTgt). In a case where the detected density (DensBelt) is higher than the target density (DensTgtB) by a value larger than a predetermined value (in this case, "30") ("Y" in Step S805), the CPU 222 subtracts "1" from the basic laser power (BaseLPW) (Step S806). In a case where a difference between the detected density (DensBelt) and the target density (DensTgtB) is smaller than the predetermined value (in this case, smaller than 30) ("N" in Step S805), the CPU 222 performs the processing step of Step S807. In the processing step of Step S807, the CPU 222 determines whether or not the detected density is lower than the target density (DensTgtB) by a value larger than a predetermined value (in this case, "30"). In a case where the detected density (DensBelt) is lower than the target density (DensTgtB) by a value larger than the predetermined value (in this case, "30") ("Y" in Step S807), the CPU 222 adds "1" to the basic laser power (BaseLPW) (Step S808). In a case where the detected density (DensBelt) is not lower than the target density (DensTgtB) by a value larger than the predetermined value (in this case, "30") ("N" in Step S807), the CPU 222 ends the processing without changing the basic laser power (BaseLPW). In this manner, the CPU 222 corrects LPW by increasing or decreasing LPW by ΔLPW serving as a correction value with respect to the basic laser power (BaseLPW).

Figure 9:
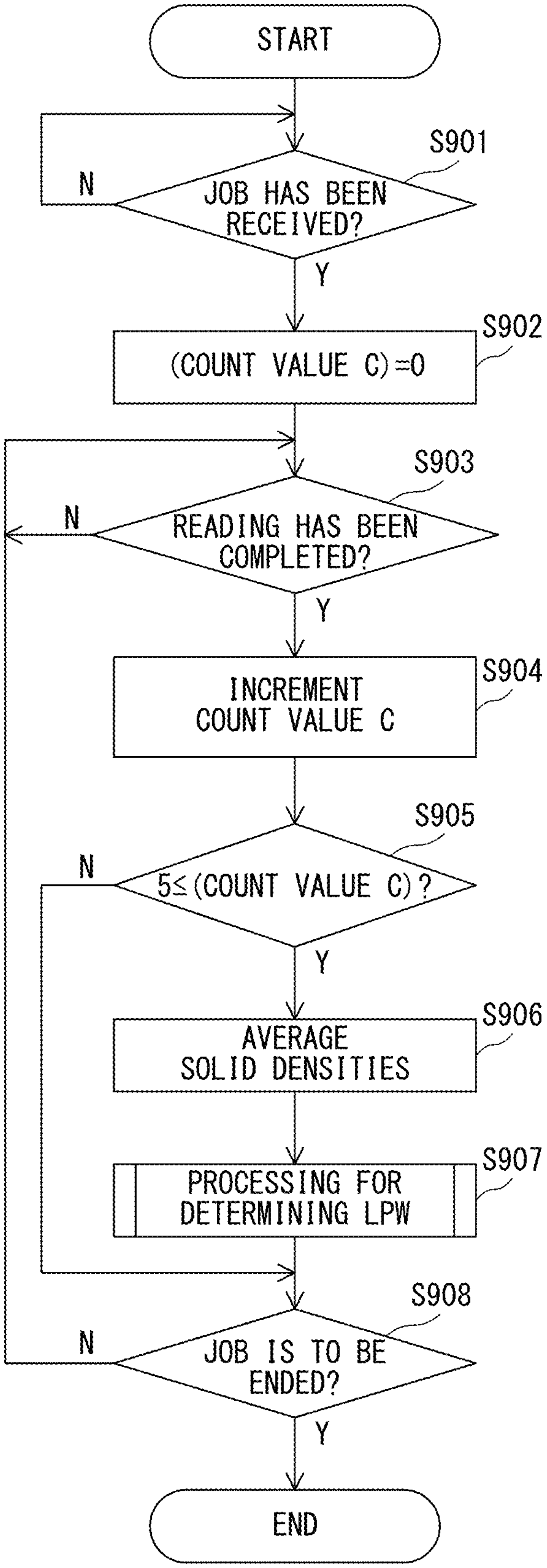
FIG. 9 is a flow chart for illustrating reading processing for the images for adjustment.

FIG. 9 is a flow chart for illustrating reading processing for the images 501 for adjustment. This processing is executed in accordance with a job for which the printing of the images 501 for adjustment is set. While the job for which the printing of the images 501 for adjustment is set is being executed, the CPU 222 executes processing for generating a basic laser power (BaseLPW) based on the detection results of the images 503 for adjustment obtained by the optical sensor 310. The CPU 222 causes the image forming units 120, 121, 122, and 123 to form the images 503 for adjustment each time the user images corresponding to "28" pages have been formed. The CPU 222 causes the optical sensor 310 to read the images 503 for adjustment, and determines the basic laser power (BaseLPW) based on the image density of the tone patch having a tone value of 255 in the images 503 for adjustment. The reading processing for the images 503 for adjustment for determining the basic laser power (BaseLPW) is executed independently of the reading processing for the images 501 for adjustment. Description of the reading processing for the images 503 for adjustment is omitted herein.

The CPU 222 stands by until the CPU 222 receives a job from the external controller 102 ("N" in Step S901). In a case where the CPU 222 receives the job ("Y" in Step S901), the CPU 222 initializes a count value C, which is a variable for counting the number of read charts 500 for adjustment, to "0" (Step S902). The CPU 222 stands by until the reading of one chart 500 for adjustment has been completed ("N" in Step S903). The CPU 222 forms the user image and the images 501 for adjustment that correspond to the job on a sheet by the printing apparatus 107, and reads the images 501 for adjustment by each of the CISs 321 and 322. In a case where the reading of one chart 500 for adjustment has been completed ("Y" in Step S903), the CPU 222 increments the count value C by "1" (Step S904). In cooperation with the CPU 272, the CPU 222 cuts off a margin part of the read chart 500 for adjustment by the finisher 109 to generate a printed matter, and delivers the printed matter to the stack tray 332.

The CPU 222 determines whether or not the incremented count value C is a predetermined value or more, in this case, "5" or more (Step S905). This processing enables the CPU 222 to determine whether or not the images 501 for adjustment have been read from a predetermined number or more, namely, "5" or more charts 500 for adjustment.

In a case where the count value C is the predetermined value or more, in this case, "5" or more ("Y" in Step S905), the number of sets of reading results of the images 501 for adjustment has reached the number required for the averaging. The CPU 222 averages the solid densities of the images 501 for adjustment (Step S906). The CPU 222 performs the processing for determining LPW, which has been described with reference to FIG. 8, through use of the average density (DensAve) obtained by the averaging and the detected density (DensBelt) (Step S907). After the processing for determining LPW, the CPU 222 determines whether or not the job is to be ended (Step S908). In a case where the job is not to be ended ("N" in Step S908), the CPU 222 repeatedly performs Step S903 and the subsequent processing steps. In a case where the job is to be ended ("Y" in Step S908), the CPU 222 ends the processing.

In a case where the count value C is smaller than the predetermined value, in this case, smaller than "5" ("N" in Step S905), the CPU 222 skips the processing step of Step S906 and the processing step of Step S907 to determine whether or not the job is to be ended (Step S908). In a case where the job is not to be ended ("N" in Step S908), the CPU 222 repeatedly performs Step S903 and the subsequent processing steps. In a case where the job is to be ended ("Y" in Step S908), the CPU 222 ends the processing. In this manner, during the job, ΔLPW is determined each time the images 501 for adjustment corresponding to the predetermined value or more (predetermined number or more of sheets) have been read.

<Correction of LPW in Case of Job in which Images for Adjustment are not Printed on Sheet>

Figure 10A:
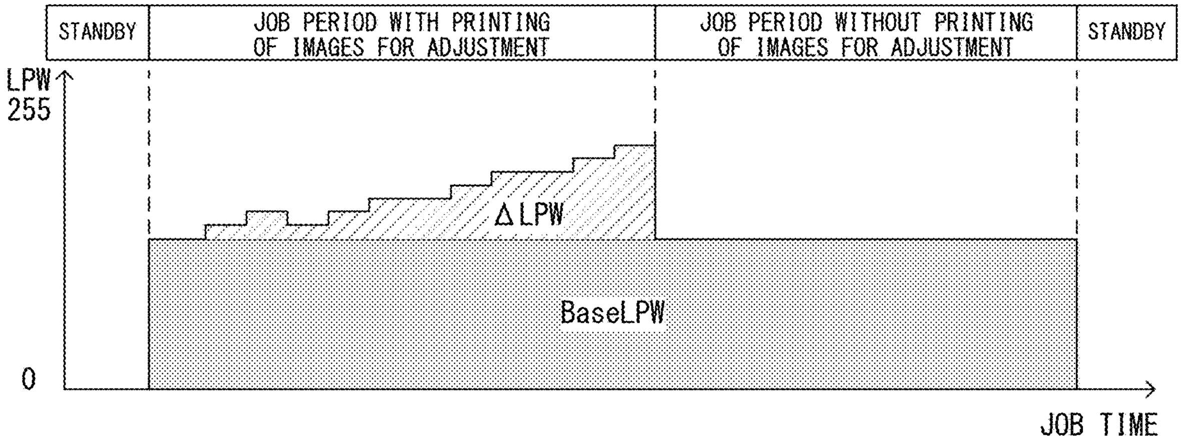
FIG. 10A and FIG. 10B are explanatory diagrams of control for correcting LPW.
Figure 10B:
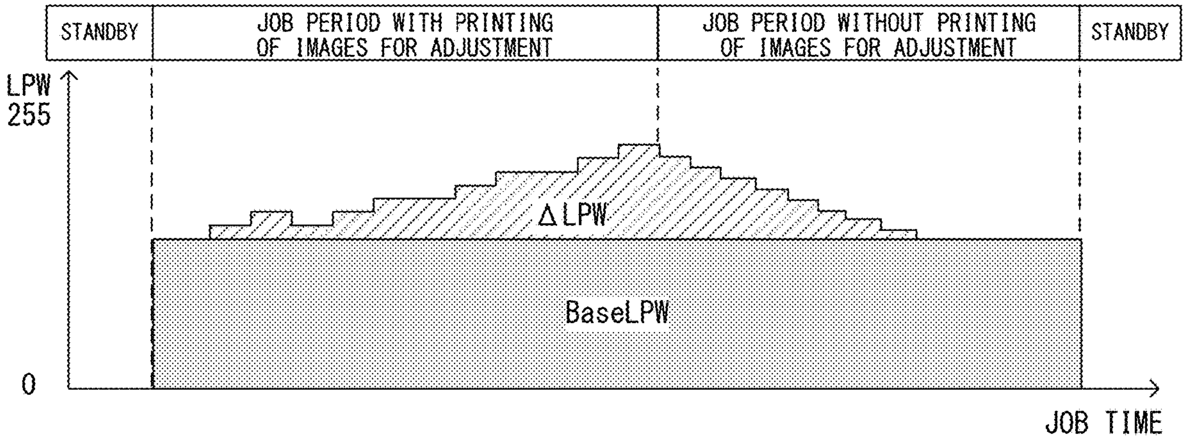

FIG. 10A and FIG. 10B are explanatory diagrams of control for correcting LPW. FIG. 10A exemplifies an accumulated amount of the correction value (ΔLPW) of LPW obtained in a case where a job for which the printing of the images 501 for adjustment is not set is executed successively under a state in which ΔLPW has been accumulated by a job for which the printing of the images 501 for adjustment is set. FIG. 10A is a reference example of a case in which the correction values for the image forming conditions determined based on the reading results of the previously formed images 501 for adjustment are canceled. In a case where the job for which the printing of the images 501 for adjustment is not set is started, the correction value (ΔLPW) of LPW is changed to a default value (initial value of "0"). For that reason, a color tint of an image formed on a sheet varies, and the image quality deteriorates.

FIG. 10B exemplifies an accumulated amount of the correction value (ΔLPW) of LPW obtained in a case where a job for which the printing of the images 501 for adjustment is not set is executed successively under a state in which ΔLPW has been accumulated by a job for which the printing of the images 501 for adjustment is set in this embodiment. In a case of the job for which the printing of the images 501 for adjustment on a sheet is not set, the correction of LPW based on the reading of the images 501 for adjustment is not performed. However, in a case where the correction of LPW based on the reading of the images 501 for adjustment printed on the sheet was performed in the previous job, the correction value (ΔLPW) is applied to the basic laser power (BaseLPW) serving as a base to form an image. This reduces a difference in level of the image density at a time of switching from a job for which the printing of the images for adjustment on the sheet is set to a job for which the printing of the images for adjustment on the sheet is not set.

The correction value of LPW in the case of the job for which the printing of the images for adjustment on the sheet is set is the correction value for a job of correcting LPW in real time through use of the images 501 for adjustment on the sheet. In the job for which the printing of the images for adjustment on the sheet is not set, each time user images have been printed on a predetermined number of sheets, the absolute value of the correction value of LPW is decreased by "1." Thus, a change amount of LPW based on the correction value is gradually decreased, thereby being capable of reducing the difference in level of the image density. In a case where the job for which the printing of the images for adjustment on the sheet is set is again executed, the correction value is subjected to addition or subtraction again with the correction value of LPW at that time point being used as an origin.

Figure 11:
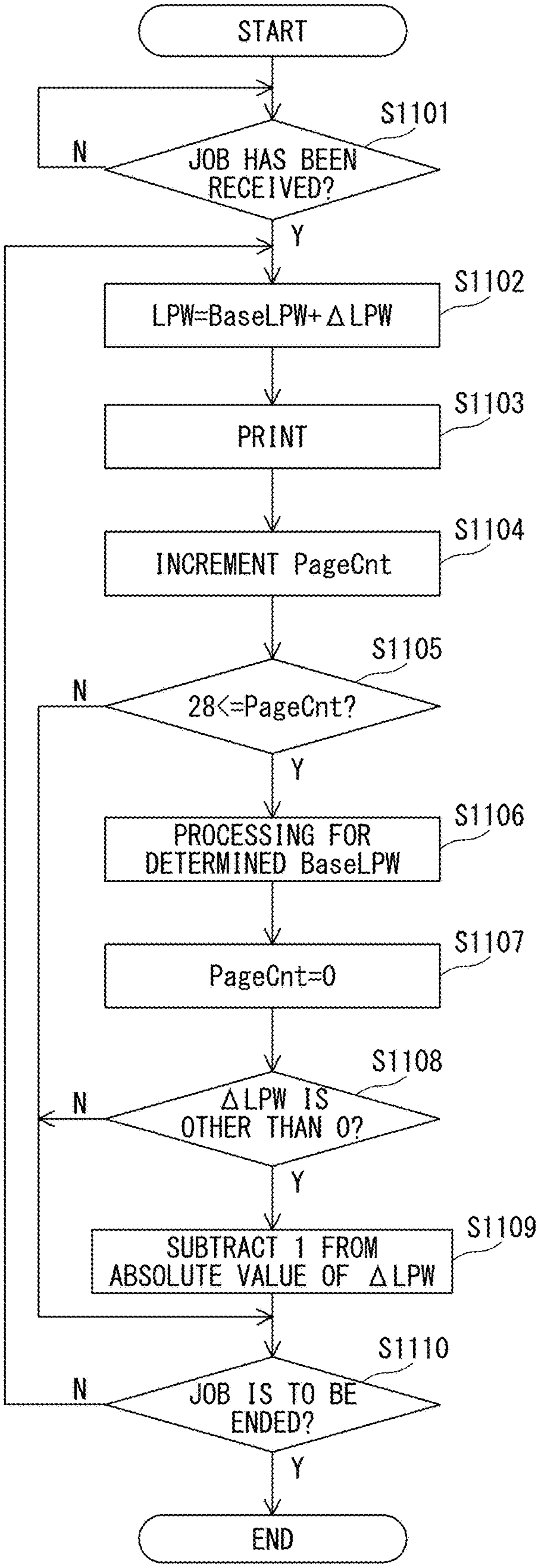
FIG. 11 is a flow chart for illustrating processing for determining LPW.

FIG. 11 is a flow chart for illustrating the processing for determining LPW in the case of the job for which the printing of the images 501 for adjustment on the sheet is not set.

The CPU 222 stands by until the CPU 222 receives a job from the external controller 102 ("N" in Step S1101). In a case where the CPU 222 receives the job ("Y" in Step S1101), the CPU 222 determines LPW to be used at a time of image formation by summing up the basic laser power (BaseLPW) and the correction value (ΔLPW) (Step S1102). The CPU 222 prints the user image corresponding to the job through use of the determined LPW (Step S1103). The CPU 222 increments a count value PageCnt by "1" each time the user image corresponding to one page has been printed (Step S1104). The count value PageCnt is a variable for determining a timing for gradually decreasing the absolute value of the correction value (ΔLPW).

The CPU 222 determines whether or not the incremented count value PageCnt is a predetermined number or more (in this case, "28" or more) (Step S1105). In a case where the count value PageCnt is "28" or more ("Y" in Step S1105), the CPU 222 executes the processing for determining the basic laser power (BaseLPW) (Step S1106). At this time, the CPU 222 causes the image forming units 120, 121, 122, and 123 to form the images 503 for adjustment, and causes the optical sensor 310 to read the images 503 for adjustment. Then, the CPU 222 executes the processing steps of from Step S805 to Step S808, which are illustrated in FIG. 8. Thus, the basic laser power (BaseLPW) is generated and updated. Subsequently, the CPU 222 initializes the count value PageCnt to set the count value PageCnt to "0" (Step S1107). The CPU 222 determines whether or not ΔLPW is other than "0" (Step S1108). In a case where ΔLPW is other than "0" ("Y" in Step S1108), the CPU 222 subtracts "1" from the absolute value of ΔLPW (Step S1109). That is, the CPU 222 subtracts "1" from the absolute value of the correction value (ΔLPW) determined based on the reading results of the images 501 for adjustment each time the user image has been printed on a predetermined number of sheets.

After the absolute value of the correction value (ΔLPW) is subjected to the subtraction, the CPU 222 determines whether or not all the images based on the job have been formed (Step S1110). In a case where not all the images based on the job have been formed ("N" in Step S1110), the CPU 222 advances the process to Step S1102. Thus, until the formation of all the images based on the job has been finished, the processing steps of from Step S1102 to Step S1110 are repeatedly executed. When all the images based on the job have been formed ("Y" in Step S1110), the CPU 222 ends the processing.

Meanwhile, in a case where the count value PageCnt is smaller than the predetermined value (smaller than "28") ("N" in Step S1105), or in a case where ΔLPW is "0" ("N" in Step S1108), the CPU 222 advances the process to Step S1110. Each time the images corresponding to "28" pages have been formed, the CPU 222 updates the basic laser power (BaseLPW) and decreases the change amount of the correction value (ΔLPW).

As described above, the image forming apparatus 101 according to this embodiment continuously uses a correction value for the image forming conditions generated based on the images 501 for adjustment even in the case of the job for which the printing of the images 501 for adjustment on the sheet is not set. Each time images corresponding to a predetermined number of pages have been formed, the image forming apparatus 101 gradually decreases the change amount of the image forming conditions based on the correction value. Accordingly, it is possible to suppress variations in density of an image formed on a sheet even when the job for which the printing of the images for adjustment on the sheet is set in order to adjust the correction value in real time has been switched to the job for which the printing of the images for adjustment on the sheet is not set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-089869, filed May 28, 2021, which is hereby incorporated by reference herein in its entirety.

What is claimed is:

1. An image forming apparatus comprising:

an image forming unit configured to form an image on a sheet based on an image forming condition;

an image reader configured to read an image for adjustment of the image forming condition, which is formed on the sheet; and a controller configured to:

control, in a case of a job for which printing of the image for adjustment is set, the image forming unit to form the image for adjustment on the sheet, and generate a correction value for the image forming condition based on a reading result of the image for adjustment, which has been obtained by the image reader, to thereby adjust the image forming condition based on the correction value; and decrease, in a case where an image is formed based on the job for which the printing of the image for adjustment is set and then an image is formed based on a job for which the printing of the image for adjustment is not set, a change amount of the image forming condition based on the correction value generated while the image is being formed based on the job for which the printing of the image for adjustment is set, each time images corresponding to a predetermined number of pages have been formed.

2. The image forming apparatus according to claim 1, wherein the controller is configured to subtract an absolute value of the correction value in a case of the job for which the printing of the image for adjustment is not set, to thereby adjust the image forming condition based on the correction value subjected to the subtraction.

3. The image forming apparatus according to claim 1, wherein the controller is configured to subtract an absolute value of the correction value by one in a case of the job for which the printing of the image for adjustment is not set, to thereby adjust the image forming condition based on the correction value subjected to the subtraction by one.

4. The image forming apparatus according to claim 1, wherein the controller is configured to subtract an absolute value of the correction value in a case where the number of sheets on which an image has been formed by the image forming unit based on the job for which the printing of the image for adjustment is not set reaches a predetermined number of sheets.

5. The image forming apparatus according to claim 1, wherein the controller is configured to subtract an absolute value of the correction value each time the number of sheets on which an image has been formed by the image forming unit based on the job for which the printing of the image for adjustment is not set reaches a predetermined number of sheets.

6. The image forming apparatus according to claim 1, wherein the image forming unit is configured to:

irradiate a photosensitive member with laser light to form an electrostatic latent image on the photosensitive member, and develop the electrostatic latent image to generate the image; and adjust intensity of the laser light as the adjustment of the image forming condition.

7. The image forming apparatus according to claim 6, wherein the controller is configured to adjust, based on the correction value, intensity of the laser light for obtaining an image having a target density, to thereby adjust the image forming condition.

8. The image forming apparatus according to claim 6, wherein the controller is configured to sum up the correction value and intensity of the laser light for obtaining an image having a target density, to thereby adjust the image forming condition.

9. The image forming apparatus according to claim 1, wherein the controller is configured to perform, in a case where the job for which the printing of the image for adjustment is not set is executed and then the job for which the printing of the image for adjustment is set is again executed, one of addition or subtraction on the correction value at a time point of the re-execution based on the reading result of the image for adjustment, which has been obtained by the image reader.

* * * * *